United States Patent [19]
Chow

[11] Patent Number: 5,644,629
[45] Date of Patent: Jul. 1, 1997

[54] AUTOMATIC ROUTING OF INCOMING TELEPHONE CALLS TO A PLURALITY OF RECEIVING DEVICES BASED ON CALLER IDENTIFICATION

[75] Inventor: Chan You Chow, Stow, Mass.

[73] Assignee: SNI Innovation, Inc., Stow, Mass.

[21] Appl. No.: 429,479

[22] Filed: Apr. 27, 1995

Related U.S. Application Data

[63] Continuation-in-part of Ser. No. 37,896, Mar. 26, 1993, abandoned.

[51] Int. Cl.⁶ .............................. H04M 3/42; H04M 1/57
[52] U.S. Cl. .............................. 379/142; 379/67; 379/210; 379/199
[58] Field of Search .................... 379/142, 210, 379/211, 212, 127, 198, 199, 201, 67

[56] References Cited

U.S. PATENT DOCUMENTS

| | | | |
|---|---|---|---|
| 4,266,098 | 5/1981 | Novak . | |
| 4,924,496 | 5/1990 | Figa et al. | 379/142 |
| 4,937,854 | 6/1990 | Srakas | 379/199 |
| 5,029,196 | 7/1991 | Morganstein | 379/142 |
| 5,268,958 | 12/1993 | Nakano | 379/211 |
| 5,377,260 | 12/1994 | Long | 379/142 |
| 5,388,150 | 2/1995 | Schneyer et al. | 379/142 |

*Primary Examiner*—Ahmad F. Matar
*Attorney, Agent, or Firm*—Edwin H. Paul; Jerry Cohen; Perkins, Smith & Cohen, LLP

[57] ABSTRACT

Apparatus for routing incoming telephone calls to a telephone or an automatic answering device, wherein caller identification numbers are received, compared to stored caller identification numbers, and arranged into priority groups for handling such calls. The apparatus has at least three operating modes designed to accommodate the user at home, the user while away from home, and another when the user wants not to be disturbed. The system is programmable between and among the operating modes, group priorities, and offers a password to restrict programming changes. The inventive apparatus and method provides for connecting incoming calls to a programmed sequence of different outputs, and to switch or "bounce" the incoming call among these outputs according to the programming. A microprocessor (6), memory (10), operating mode displays (9), and an interactive two row LCD display (8) are provided. There are four function keys which are programmed to allow inputting and displaying all the functions of the apparatus, including information status, system test/status and all the various operations required to receive and route incoming calls.

20 Claims, 5 Drawing Sheets

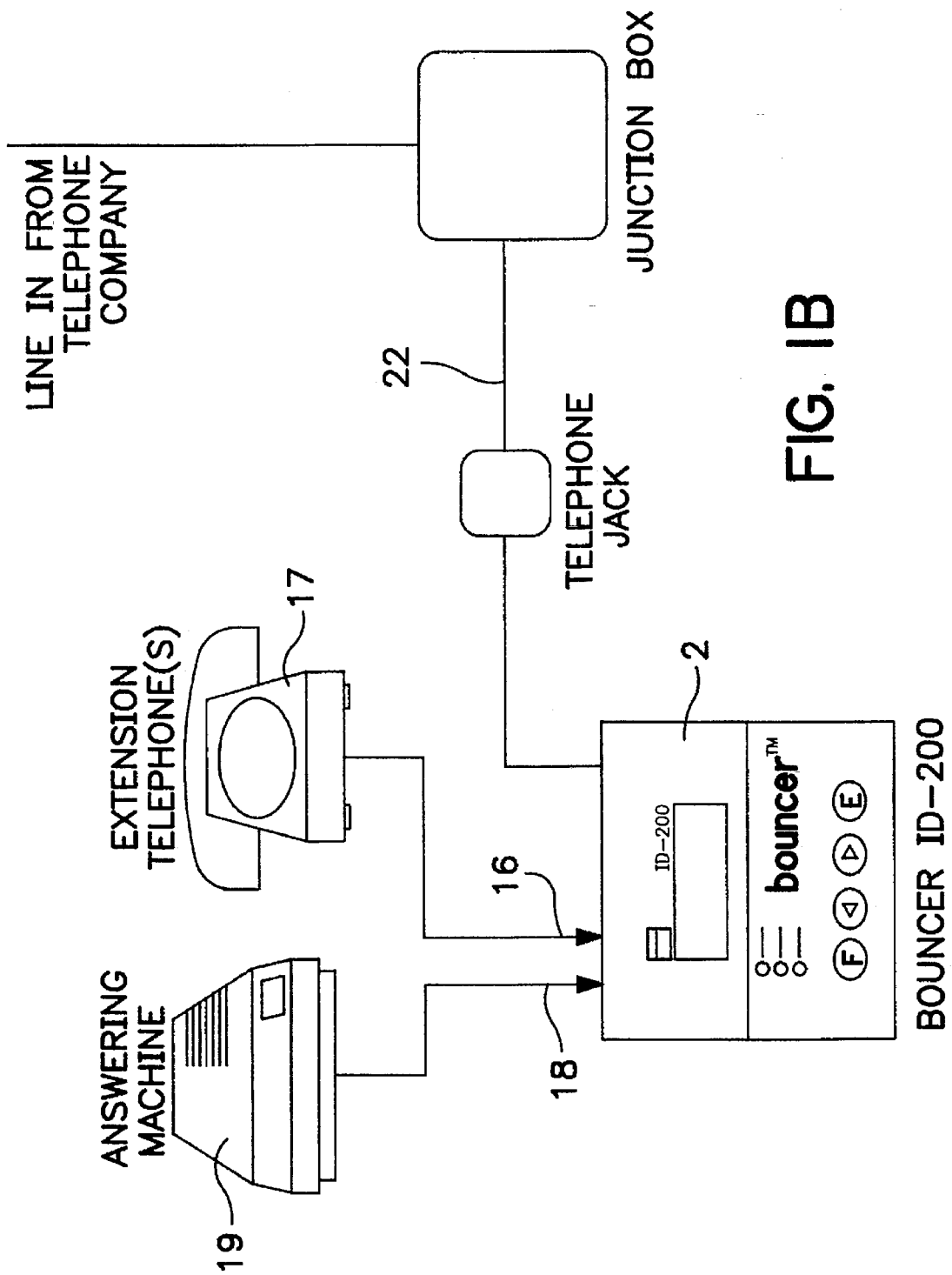
FIG. IB

AUTOMATIC ROUTING OF INCOMING TELEPHONE CALLS TO A PLURALITY OF RECEIVING DEVICES BASED ON CALLER IDENTIFICATION

CROSS REFERENCE TO RELATED PATENT APPLICATIONS

The present application is a continuation-in-part of U.S. application, Ser. No. 08/037,896 —filed on Mar. 26, 1993, (now abandoned). This prior application is of common: title, inventorship, and assignment to the present application, and this prior application is incorporated by reference as if set out in length herein.

FIELD OF THE INVENTION

The present invention relates generally to systems which manage received telephone calls and can actively and automatically route such incoming telephone calls to telephones, automatic answering and recording machines, faxes, modems, and the like based on a received caller identification. The present invention more particularly relates to programmable electronic hardware and software to route such incoming telephone calls.

BACKGROUND OF THE INVENTION

Unwanted or harassing telephone calls have been a nuisance for the public for many years generating many police complaints. This is especially true for unwanted calls to women. But, at the same time important calls must be answered promptly, so the public should not be held captive by the unwanted calls. Also, in recent years many other telephone services have become available, e.g. answering and recording machines, fax machines, connections to home computers, and the like. There has developed a need to accommodate these different services by routing such calls to the proper devices, to screen out unwanted calls yet to have important calls be received with priority.

Telephone companies over the last decade or so have offered a service wherein an identity code, referred to as Caller Identification or CID, is transmitted after the first ring signal to a receiving telephone. The present invention is directed to use of the CID.

A U.S. Pat. No. 5,029,196 to Morganstein, entitled, AUTOMATIC CALL SCREENING, issued on Jul. 2, 1991. Morganstein describes a system for use with a private branch exchange (PBX) utilizing the CID. The Morganstein system can store CIDs together with destinations used in conjunction with a PBX. Also, the person or entity, associated with any CID, may be stored and displayed for use by the person answering the call. But, as distinguished from the present invention, the Morganstein system always goes off-hook, and returns this signal to the telephone office so that the caller hears the call being answered. Typically, when an incoming call is answered by lifting a telephone a load is placed on the incoming telephone lines (or wires). This load causes a 20 to 100 milliampere current to flow in the incoming lines. This current is sensed at the telephone office to indicate that the receiving telephone was lifted or answered whereupon the telephone office will stop the ring signal. Since the present invention routs the incoming ring signal, the receiving apparatus must remain in the on-hook condition or state. The present invention allows the receiving telephone or the automatic answering device to provide the off-hook condition. An advantage of the present invention is that there is no circuitry needed to create the off-hook condition (referred to herein as "going off-hook"), and that the routing of the ring signal is completely invisible to the caller—the caller hears only the ring signal provided by the telephone company. Another operational advantage of the present invention is that an incoming call may be terminated such as to confound the caller by routing the incoming ring signal to an automatic answering device. The automatic answering device will go off-hook, the present invention detects the off-hook signal, waits for a second or so, and then breaks the connection to the incoming telephone lines, thus going quickly on-hook to terminating the call. To the caller it will sound as if a receiver was lifted and immediately replaced. These advantageous operations and conditions are not disclosed or suggested by Morganstein.

Another prior art patent, U.S. Pat. No. 4,266,098 to Novak, entitled, DEVICE TO AUTOMATICALLY SCREEN INCOMING TELEPHONE CALLS, DETERMINE THE IDENTITY OF THE CALLER AND PROCESS THE CALL ACCORDINGLY, issued on May 5, 1981. Novak's object is to screen incoming calls to prevent an unwanted call from coming through to disturb the called person. Another object of Novak is to prevent would-be burglars from determining whether or not someone was at home. The caller must input an identity code using the touch-tones on the telephone keyboard. If the input code matches a code that was previously stored in memory in the Novak invention, the system will responds as programmed. Such responses may include connecting the incoming call through to a telephone or an automatic answering machine or, if the identity code were not found in the memory, to return a recorded "ring signal" back to the caller. However, a limitation of Novak's invention is that it always answers the incoming call by going off-hook. The would-be burglar will hear a receiver being lifted, then he will hear the taped ring sound (or a taped message). In fact the going off-hook will be clearly heard and understood by virtually any caller, and is not likely to fool a would-be burglar. In contrast, the present invention is invisible to the caller. The present invention uses the CID that is determined and generated by the telephone company—the caller cannot fake, alter or interfere with the telephone company sending out the CID. An advantage of the present invention, when a call is to be terminated, as described above, occurs by the present invention providing the quick off-hook/on-hook sequence that will seem like the called person lifted and then replaced the telephone without time to listen to or otherwise determine any information about the caller. This will certainly confuse any would-be burglar as to the whereabouts of the called person.

Novak has other limitations, since the identity input must be manually keyed in. Novak provides an off-hook signal, and then determines what type of response should be accorded an incoming call. In this condition the caller is "into" the called system. For example, if the incoming call is connected via a modem to a computer system where other codes activate other operations, the caller can intrude further into the called system. The present invention remains on-hook while determining what type of response should be accorded an incoming call, and prevents the caller from further intrusion unless so programmed by the user.

In addition, Novak does not suggest the ability for: operation with multiple telephones; programming a sequence operation among multiple telephones and automatic answering devices; prioritizing calls; forming modes of operation; forming priority groupings of calls; relating the rings to the priority; and rejecting calls as in the present invention. Since the present invention routes the ring signal and does not go off-hook, the caller is not connected to the called system so it is virtually impossible for the caller to gain unauthorized access or otherwise affect the operation of the called system.

Another use of the CID is found in U.S. patent to Sarakas, entitled, CALL SCREENING DEVICE, that issued on Jun. 26, 1990. This patent discloses storage of security codes which are compared to codes input by the caller. The result of the comparison determines whether the incoming call is put through or not. However, Sarakas does not store telephone numbers, and does not disclose or suggest use of routing the incoming call ring signal to a programmed sequence of telephone receivers or answering machines.

Yet another prior use of CIDs is found in the U.S. patent to Figa et al., entitled, AUTOMATIC INCOMING TELEPHONE CALL ORIGINATING NUMBER AND PARTY DISPLAY SYSTEM, that issued on May 8, 1990. This patent discloses a display and call logging apparatus, but has no suggestion of sequential routing of the incoming ring signals as in the present invention.

It is an object of the present invention to provide a system to protect the receiver's privacy, and to prevent the caller from determining the whereabouts of the called party.

Another object of the present invention is to route the incoming ring signal without providing an off-hook signal back to the telephone company, such that the routing of the ring signal occurs before any indication of such routing is received by the caller.

It is another object of this invention to provide hardware and software to identify, incoming calls and to react to such calls by routing the call ring signal as the owner determines.

It is another object of the present invention to establish a priority routing of an incoming call to establish a number of modes for handling and routing incoming calls, and to route sequentially the incoming call ring signal to a variety of telephones and answering devices as the owner may program.

Yet another object of the present invention is to provide a password or passcode that will prevent inadvertent operation or reprogramming of the present invention.

SUMMARY OF THE INVENTION

The foregoing and other objects are met with a hardware and software system to receive an incoming call ring signal, to receive the CID, to compare the CID with previously stored CIDs and to route and re-route the call as previously programmed by the users. The system receives the first ring signal from an incoming call and then the CID that the telephone company sends directly after the first ring signal. The first ring signal is suppressed from causing an audible ring by simply not connecting the ring signal to any receiving device. This sequence is not a limitation of the present invention since the CID determines where the call is to be routed, and the suppressed first ring will not disturb anyone. This CID is held by a micro-controller for comparison to stored CIDs.

In a preferred embodiment, the owner may program the system to route the incoming call ring signal to no receiving device whereupon the telephone system returns a "ring no answer" indication back to the caller, or to allow the call to go through to a telephone which rings. Alternatively, the owner may program the system to direct the call in sequence to an answering/recording machine, a fax, or a modem input to a computer, herein collectively defined as automatic answering devices. The system may be programmed to switch or bounce the incoming call among the various outputs and the answering devices connected thereto. In a preferred embodiment, the user may program the present invention to connect an incoming ring signal to an automatic answering devices, for example, a tape recorder/telephone answering device, that answers an incoming telephone call by going off-hook without an audible ring or other such indicator occurring.

In a preferred embodiment, the system may be programmed to direct an incoming call to a prioritized sequence of answering devices, where a given number or rings is sent through to each device, and, if the receiving device does not go off-hook, the present invention sends the incoming ring signal through to the next programmed device for a given number of rings. This capability can be programmed to sequentially access any number of device attached to the inventive system, and the sequence could be repeated for a given number of times. In the instance where the inventive system has directed the incoming ring signals to the second or some other lower priority answering device, and if a higher priority device goes off-hook the inventive system will connect the call to that higher priority device. In this way, the inventive system performs a prioritized screening of incoming calls.

In another preferred embodiment, the user may program the present invention with a number of modes where prioritized incoming calls may be directed to various answering devices in accord with the mode selected for the present invention and the priority of the incoming call.

Other objects, features and advantages will be apparent from the following detailed description of preferred embodiments thereof taken in conjunction with the accompanying drawings in which:

BRIEF DESCRIPTION OF THE DRAWINGS

FIG. 1B is a block diagram of a typical multiple telephone and automatic answering machine arrangement.

DETAILED DESCRIPTION OF PREFERRED EMBODIMENTS

Figure 1A:
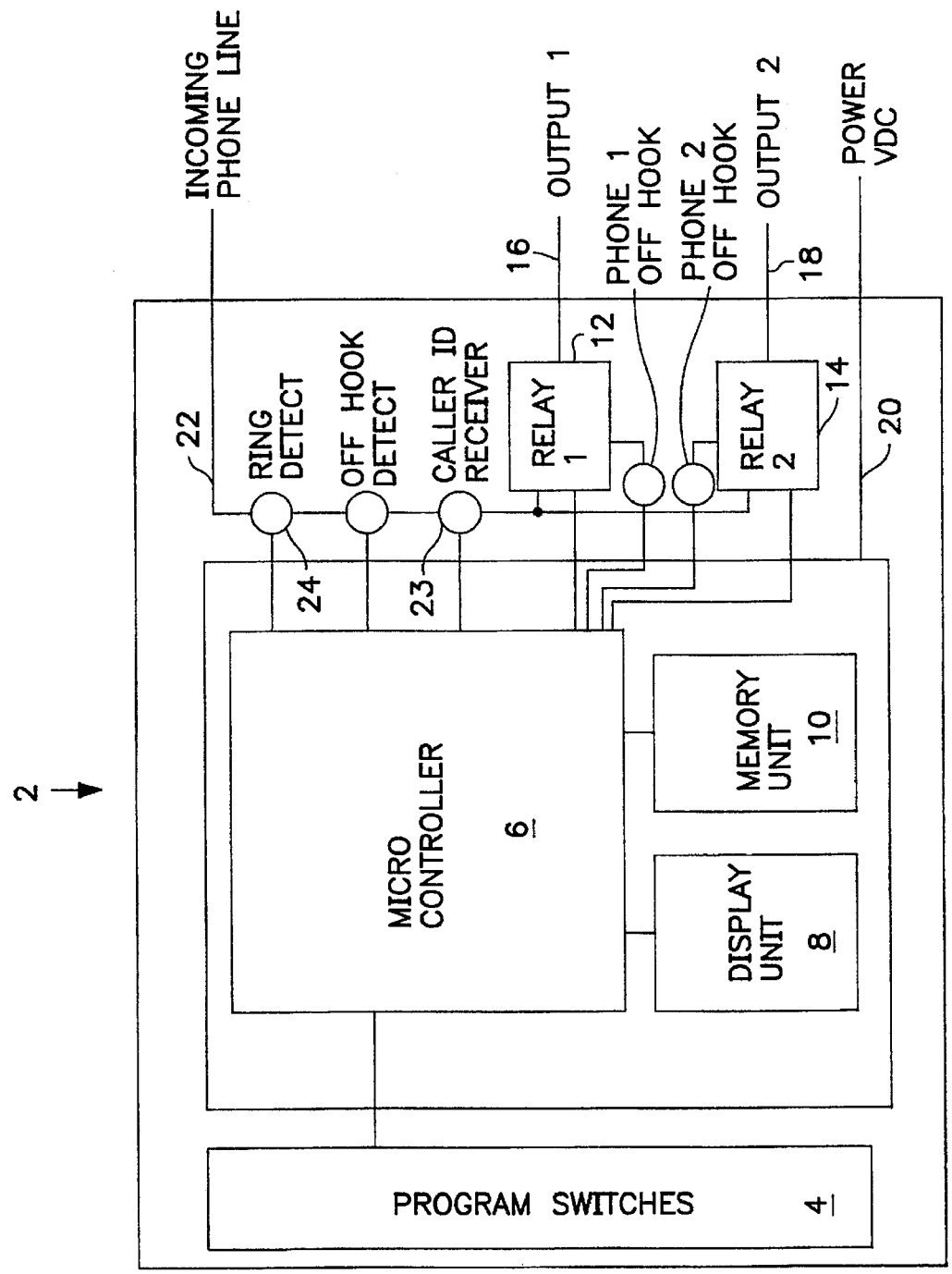
FIG. 1A is an electronic block diagram of a preferred embodiment of the present invention.

FIG. 1A is an electrical block diagram/schematic of a preferred embodiment of the present invention. The system 2 includes an integrated circuit (IC) microprocessor 6 which is programmable by switches 4. In this preferred embodiment the CID is received 23 and decoded by an IC which may be any of the commercially available devices, e.g. one such device is part number SC11211C from Sierra Semiconductor. The microprocessor is herein defined as any of the commercial types which also includes a networked connection to a remote computer system. The switches 4 maybe of any commercial type and alternatives which make or break electrical connections or provide electrical, light (uv, visible or IR), or magnetic signals. The switches are used to select the mode of operations, discussed below, and to input CIDs for storage in the memory unit 10. The display 8 provides visual feedback to the user and also provides system status, warnings and other such status.

Five volts 20 is used to power the system, and an AC adapter may be provided to convert household AC to the five volts DC. The logic and switching circuitry implementation using transistors, field effect transistors of the various known types, logic circuitry of the various known types, and passive components is well known in the art, as are the programming languages and/or programs needed to implement the various embodiment of the present invention.

Still retorting to FIG. 1A the incoming phone line 22 is terminated with a 1RJ11 standard miniature telephone line jack or connector, and outputs 1 and 2, have 2RJ11 standard miniature phone line jacks to which telephone lines, cable or wires may be connected.

FIG. 1B shows a typical example of devices and connections used with a preferred embodiment of the present invention. Referring to FIG. 1A and 1B, a telephone line from the telephone company 22 feeds into the system via a junction box and telephone jack and first encounters a ring detector 24 that indicates to the micro-controller that a first ring signal has been received. This first ring signal is not routed to any receiving devices. The micro-controller, after detection of the first ring signal, receives and decodes the tones which form the incoming CID over the telephone line 22. The micro-controller compares the received CID with stored CIDs and in response to pre-programmed instructions, handles or routes the incoming call as programmed, e.g. the micro-controller might direct the incoming call to output 1 via relay 12 or to the output 2 via relay 14.

Figure 2A:
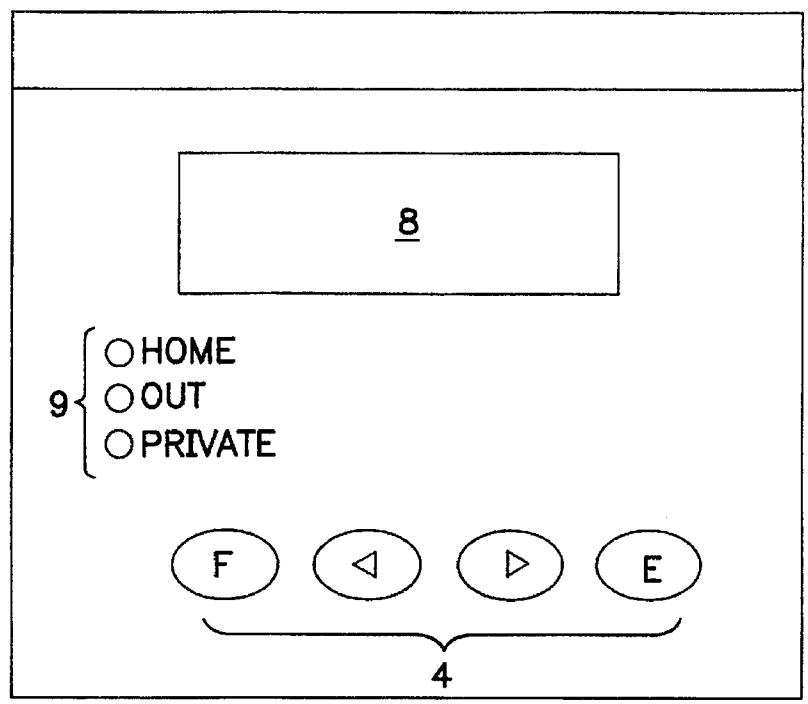
FIG. 2A is a drawing of the front panel of a preferred embodiment.

FIG. 2A shows the front panel of a preferred embodiment. In this embodiment the keys 4 include a function key (F), left(<) and right(>) cursor keys and an enter (E) key. The status of the system is indicated by LEDs 9, and information entered or called for by the user is displayed via a two row, sixteen character per row, liquid crystal display (LCD) 8. Other similar devices as are generally commercially available may be used in place of the LEDs and LCD.

Still referring to FIG. 2A, the (F) key changes the content of the operation LCD displays, the (>) and (<) keys scroll through lists, move the highlight among commands and selections, and the (E) key enters or processes the command or selection. In this preferred embodiment, there are three operating modes, each mode is indicated by an LED 9, the HOME mode, the OUT mode and the PRIVATE mode. These names are generally indicative of what the user desires or of the user's status. The user is at HOME, the user is OUT, and the user wants privacy in the PRIVATE mode— the user does not want to be disturbed except by few callers, designated priority callers, which will come through to ring a telephone. The contents of TABLE 1 below show how the invention handles calls of different priority in each of these modes. In another preferred embodiment other modes may be used and such modes may have other definitions to meet the users needs and/or desires, e.g. businesses will have other requirements which can be programmed within the present invention by defining other modes and groups.

In other preferred embodiments many outputs can be utilized, and the controller can be programmed to accommodate prioritized sequences between and among the various answering devices that may be attached to the inventive system.

Figure 2B:
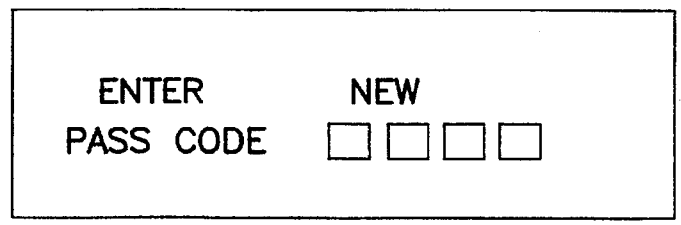
FIG. 2B is a drawing of the display of a preferred embodiment.
Figure 2C:
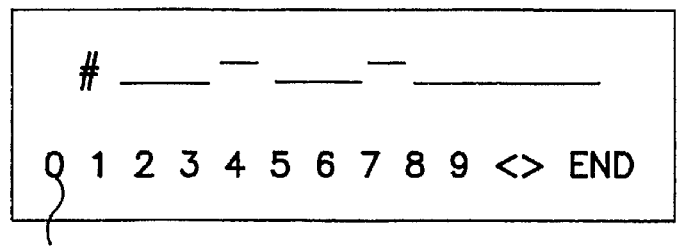
FIG. 2C is another drawing of the display of a preferred embodiment.

FIG. 2C shows the display when a phone number is being entered. When started the zero is selected and highlighted. By pressing the(<) or (>) keys the other numbers may be selected as the highlight moves. Pressing (E) enters that number in the first telephone number position. Repeating this procedure allows the entire number to be entered. In another preferred embodiment other uses of the keys to select positions to be entered, scrolling through the numerals and entering the selected numeral may be devised by those skilled in the art.

A PASSCODE may be entered as follows: when in the HOME pressing the F button causes "ENTER PASSCODE" to appear on the display window 8. Enter the existing PASSCODE (FFFF if never changed). Herein PASSCODE and PASSWORD are defined as the same thing. Next press F three times which steps through to a command menu. SET-PROTECT will appear on the display and can be selected and highlighted using the (>) key, and then press (E). CHANGE PASSWORD appears on the display and can be selected highlighted using the (>) key. At this time, for security, ENTER CURRENT PASSCODE is displayed. Referring to FIG. 2B, by entering via the keyboard the current PASSCODE, ENTER NEW PASSCODE appears on the display. The new PASSCODE is then entered and verified. The PASSCODE is any combination of the four buttons 4.

The PASSCODE is an option which is meant, in a preferred embodiment, to "child proof" the invention during home use rather than a security code. In such an embodiment fuming power off then on resets the PASSCODE to FFFF. However, in other preferred embodiments, the password provides security protection from unauthorized use of the system wherein non-volatile storage is provided for the PASSCODE. The non-volatile nature of the PASSCODE storage may be EEPROM or battery powered arrangements as are well known in the art.

In a preferred embodiment, when you first apply power, the system will assume the default conditions and be ready to receive an incoming call. After the first call is received that caller identification number will be displayed on the LCD display.

In typically operation the telephone number of the last caller, the time of the call, and the number of calls received are displayed on the LCD and stored in the call log memory (how many calls were received and logged). Other combinations may be displayed in other preferred embodiments. By pressing the (<) and (>) keys the logged caller numbers may be scrolled through. Whatever number is displayed may be placed into the caller directory memory with code designating one of the operating groups P, A, D, F or R, by entering the password and selecting and executing commands from menus displayed. The logged call will be stored as the telephone number and the time called (#/time); optionally, the name of the caller may be also stored.

Through methods as illustrated in the two preceding paragraphs, and similar methods well known in the art a preferred embodiment may be programmed to: select one of three operating modes; input telephone CIDs received, place such calls into one of five groups; store CIDs; ring such receivers attached to the outputs of the preferred embodiment for a programmable selected number of times; transfer the incoming call between such attached receivers; terminate such calls; time out between actions taken; maintain a log of incoming calls by time, number and name; allow user to select and change a password; assign the most recent call to a group; view caller log; view CID of each group and transfer such CIDs between groups; and reject or block or terminate unknown CIDs without ringing any receiver.

Other preferred embodiments may use large keyboards and allow programming such that a preferred embodiment system may respond with canned messages, may provide user remote interrogation and other such actions as are known in the art.

TABLE 1 details the operating modes described later in FIG. 3. In this preferred embodiment a telephone is connected to output 1 and an automatic answering machine to output 2. In other preferred embodiments additional and different equipment may be used.

indicates the action taken on the incoming telephone call that the user has programmed for each of the different prioritized groups within the mode:

PRIORITY(P)—a high priority caller group where the telephone will ring in both HOME, OUT and PRIVATE modes before being transferred to an automatic answering machine. The phone is programmed for five rings (allowing time for the user to answer the call) the HOME mode, in the

TABLE 1

| OPERATING MODE | CALLER GROUP | ACTION TAKEN ON INCOMING CALL |
| --- | --- | --- |
| HOME | PRIORITY(P) | Connect to output 1 (telephone), after five rings transfer to output 2 (answering machine) |
| HOME | ACCEPT(A) | Connect to output 1 (telephone), after five rings transfer to output 2 (answering machine) |
| HOME | DEFAULT(D) | Connect to output 1 (telephone), after two rings transfer to output 2 (answering machine) |
| HOME | FORWARD(F) | Connect to output 2 (answering machine) |
| HOME | REJECT(R) | Connect to output 2 (answering machine), when off hook detected disconnect (hang up) thus rejecting the call |
| OUT | PRIORITY(P) | Connect to output 1 (telephone), after five rings transfer to output 2 (answering machine) |
| OUT | ACCEPT(A) | Connect to output 1 (telephone), after two rings transfer to output 2 (answering machine) |
| OUT | DEFAULT(D) | Connect to output 2 (answering machine) |
| OUT | FORWARD(F) | Connect to output 2 (answering machine) |
| OUT | REJECT(R) | Connect to output 2 (answering machine) when off hook detected disconnect (hang up) thus rejecting the call |
| PRIVATE | PRIORITY(P) | Connect to output 1 (telephone), after five rings transfer to output 2 (answering machine) |
| PRIVATE | ACCEPT(A) | Connect to output 2 (answering machine) |
| PRIVATE | DEFAULT(D) | Connect to output 2 (answering machine) |
| PRIVATE | FORWARD(F) | Connect to output 2 (answering machine) |
| PRIVATE | REJECT(R) | Connect to output 2 (answering machine) when off hook detected disconnect (hang up) thus rejecting the call |

In another preferred embodiment the system may be programmed to combine the groups in any combination under each operating mode, e.g. in mode OUT groups P and X may be put together in which the invention will handle calls from both of these groups in the same way. Similarly, other groupings may be made. In other preferred embodiments the placing of a call in the various groups is completely under the control of the user, and the action taken is also completely under the control of the user. The user may determine to terminate the call, to which outputs the call is transferred, the number of rings, and any subsequent routing.

The preferred embodiment shown in TABLE 1, by inspection, has three operating modes; HOME, OUT and PRIVATE.

These operating modes of this preferred embodiment are selected via the function F key with verification on the visual display. The HOME operating mode is designed to handle incoming calls while the user is at home. The operating mode OUT for when the user is out of the home and physically incapable of answering an incoming call, and the operating mode PRIVATE refers to a mode where the user does not want to be disturbed—the phone will not ring except for most important priority Group (P) calls.

The second column of TABLE 1 shows, for a preferred embodiment, how different groups of phone numbers are to be handled within the three operating modes. A telephone number is entered and placed into one of the following groups with priority as described below. The third column OUT mode, and In the PRIVATE mode before the call is transferred to the automatic answering machine connected to phone 2;

ACCEPT(A)—these callers are programmed in the above example as second highest priority; where the telephone will ring five times in the HOME mode, twice in the OUT mode but none in the PRIVATE mode, before the call is transferred to the answering machine;

DEFAULT(D)—a lower priority caller group where the telephone will ring twice only in the HOME mode before being transferred to the answering machine. In the OUT and PRIVATE modes the call is directly connected to the answering machine;

FORWARD(F)—these callers are routed directly to the answering machine;

REJECT(R)—these are unwanted calls that are terminated by going off-hook followed immediately by going on-hook. The phone does not ring in this preferred embodiment. Response to these calls could be programmed to be not answered at all in another preferred embodiment.

The interactions of the various groups among above modes is dependent upon the users desires, and other similar or quite different operations may be set up in other preferred embodiments. For example, more modes and groups can be created in other environments and interactions between the modes and/or groups can be programmed. In this preferred embodiment the number or rings and the transferring of callers between and/or among the groups are programmable by the user. In addition, automatic changing the priority of calls based on frequency of the calls and/or the time of day of the call can be programmed in other preferred embodiments.

Other preferred embodiments have facsimile machines and/or personal computer modems. Yet other preferred embodiments have multiple phone outputs and perform multiple transferring between such phone outputs. In yet other preferred embodiments the incoming ring signal may be routed to more that one output at the same time.

All the incoming phone calls are logged and stored for recall by the user. In this preferred embodiment the caller log will store up to 35 caller names and phone numbers, or up to 85 caller phone numbers.

The following is a brief description on use, set-up and programming of a preferred embodiment. When shipped the invention default settings are: operating mode is HOME; Display is set to #/time; Unknown Calls Assigned to Group A; and the PASSCODE is FFFF.

Figure 3A:
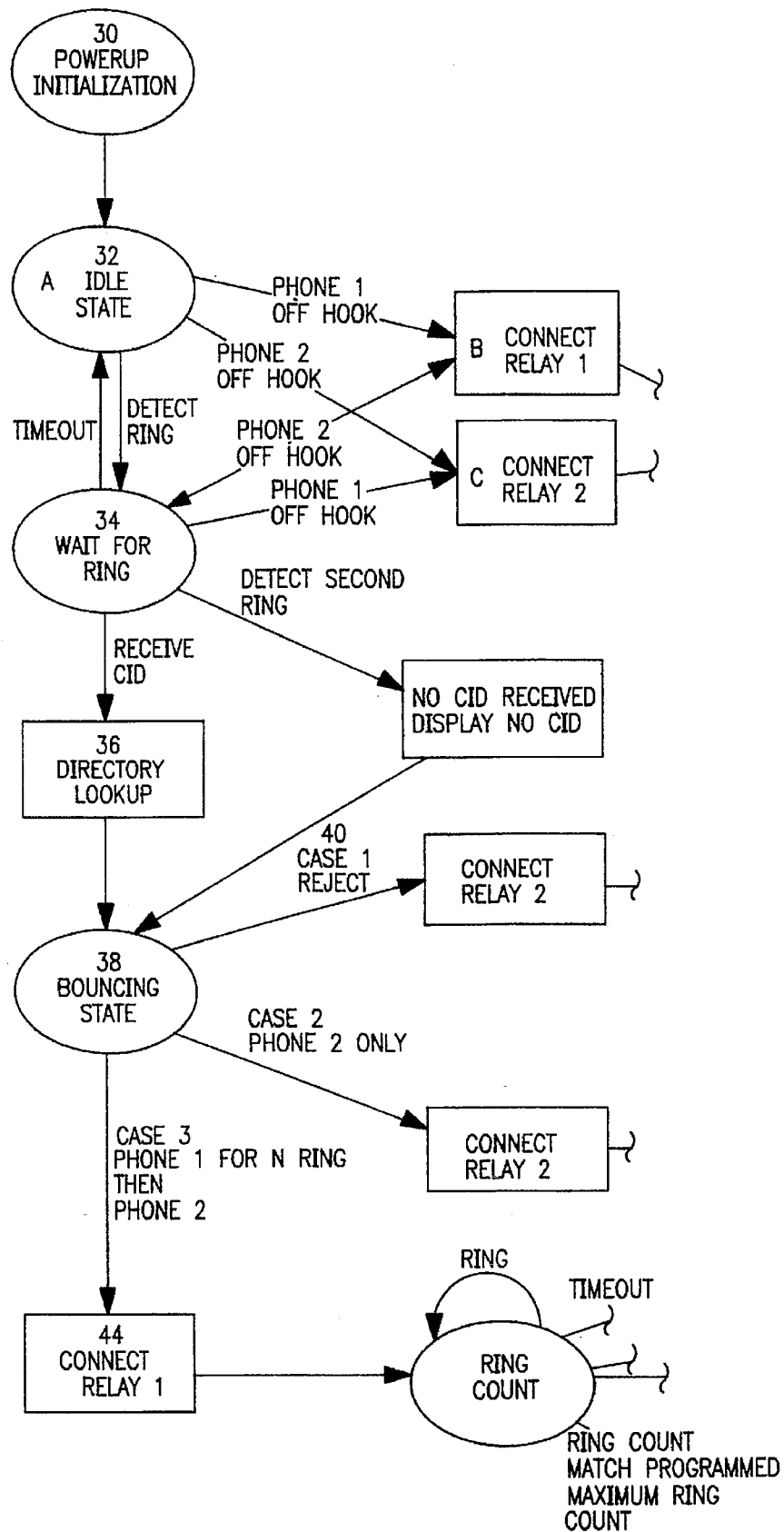
FIG. 3 is a state flow chart of a preferred embodiment of the present invention.
Figure 3B:
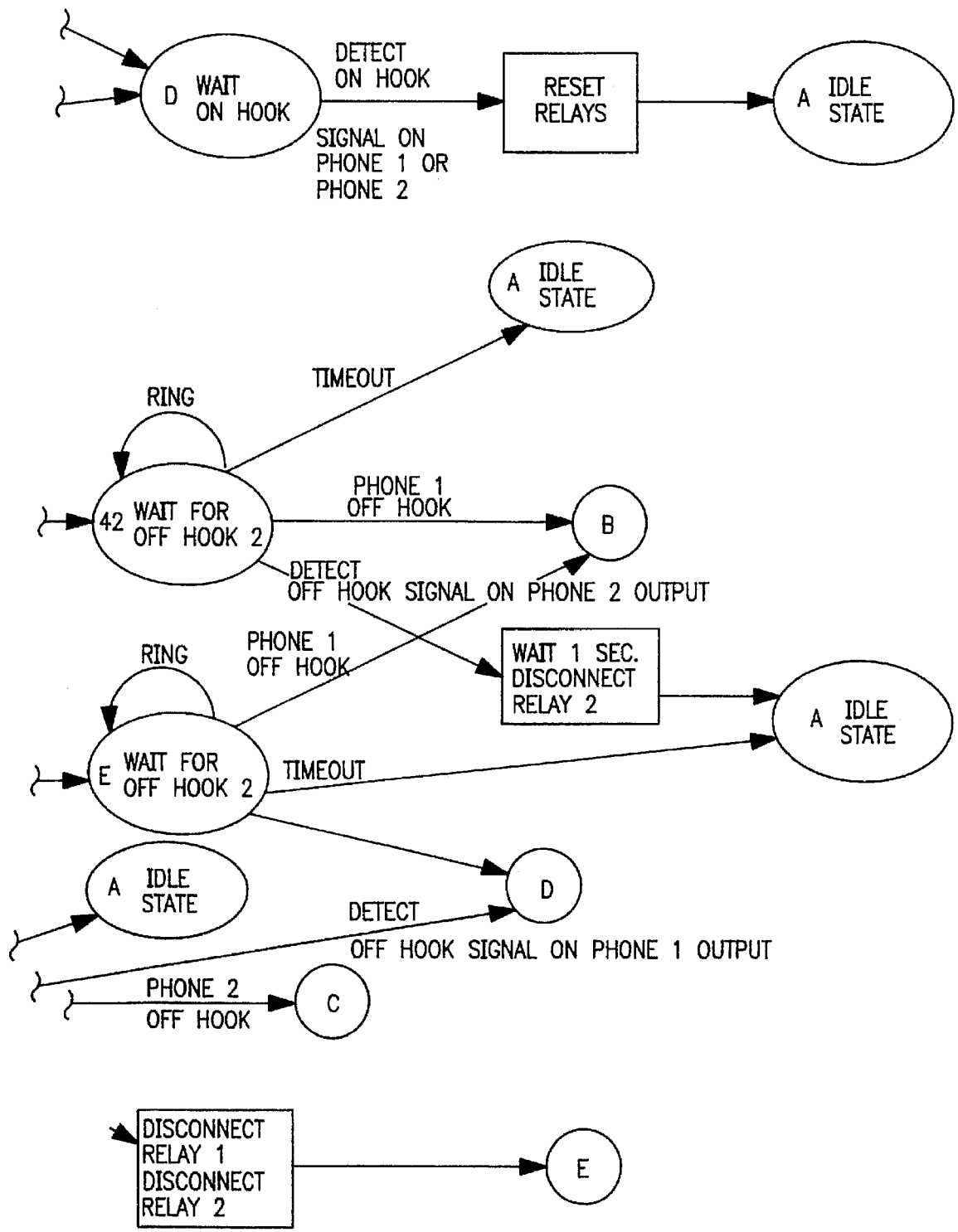

FIG. 3 shows the operation states and organization of a preferred embodiment. When power is first applied the system enters an initialization state 30. In this state the system can determine if the power was interrupted for only a short time wherein the system is programmed to return to the state where power failed. But, if such power failure happened while a call was in progress and the call was terminated then the system reacts as if the power were off intentionally. The system will still retain stored CIDs and corresponding modes of operation in an EEPROM (electrically erasable programmable read only memory). After power up the system is in an idling state A awaiting an incoming ring.

With reference to FIG. 1B and FIG. 3, while in the idle state A, if a telephone 17 is connected to output "phone 1" 16 of FIG. 1B and lifted by the user to make a call, the microcontroller detects the current flow in the telephone lines indicating that the telephone phone is "off hook". State B is entered, relay 1 is actuated and the telephone 17 is connected to the phone line 22 which lead to the central telephone office 23, so the outgoing call can be made. The system enters and stays in this busy state until the telephone 17 is hung up. At this time relay 1 is reset and the system returns to idle state A. If, while relay 1 is actuated, a device 19 connected to output phone 2 is lifted, an "off hook" signal is created and relay 2 is activated. In this condition devices 17 and 19 on the two outputs 1 and 2 are connected to each other and to the phone line 22.

If, while in idle state A, a first ring is detected on the incoming phone line 22, the system enters state 34 where the system is ready to receive the CID number from the incoming phone signal. When the CID is received the system performs a directory lookup 36 comparing the incoming CID to the stored CIDs. The system enters the bouncing state 38.

If, while awaiting a CID in state 34, a second ring occurs the system assumes that no CID is being sent by the caller. In this instance a NO CID message is displayed and the system, in this preferred embodiment, terminates the call in the manner described below as CASE 1. However, the call may be programmed to fall into case 2 or 3 (below) as the user desires.

When the comparison has found a match for a stored CID, in this preferred embodiment, three possible actions are programmed from the "bouncing" state 38.

CASE 1: If the incoming call is to be rejected or terminated, relay 2 is actuated connecting the incoming phone line 22 to the automatic answering device connected to the output phone 2. This is necessary to ensure that an off-hook signal is created since the automatic answering device will automatically go off-hook. The inventive apparatus waits a pre-programmed length of time of one second, after the off-hook is sensed, and then resets relay 2 and returns to the idle state—effectively hanging on the caller or rejecting the call. The caller will hear the sequence of the telephone receiver being picked up and immediately replaced. The caller will believe that a person picked up the telephone and immediately replaced it. In such an occurrence, if the caller was trying to determine if someone was at home, the caller will have no useful information to make such a determination.

CASE 2: In this preferred embodiment, information found in the CID lookup table for the incoming call specifies that the call is to be routed to an automatic answering device attached to output 2. Relay 2 is actuated connecting the incoming phone lines to the device connected to output 2. If the device includes a ringing mechanism, it audibly rings. The system enters state E. When the device provides an off-hook signal from output 2, state D is entered until the call is finished by the answering device creating an on-hook signal. In response, the relays are reset and the system returns to the idle state A. If no off-hook signal occurs the system times out and reverts to the idle state A. Alternatively the system may be programmed to time out or allow a given number of rings and then revert to idle state A. If a telephone connected to output 1 is lifted, while the system is in state E, state B will be entered. In this case the system is programmed to connect relay 1 and then disconnect relay 2 and the person who lifted the telephone will be connected to the incoming caller. Another preferred embodiment may display that a received call is in progress to signal any would-be user that another call is being handled.

CASE 3: In this case the incoming call is to be routed to the device connected to output 1 for a number of rings and then routed to the device connected to output 2. First, relay 1 is actuated 44. The micro-computer allows the programmed number of rings 34 to occur at the output 1 output. If the device connected to output 1 answers the incoming call by going off-hook, state D is entered. In a preferred embodiment, there is an automatic answering machine connected to output 2, this device answers the incoming call. When the call is completed relay 2 is reset and the idle state A is entered. If, after the pre-programmed number of rings, the call is not answered, relay 1 is reset, relay 2 is actuated, and state E is entered. This state may be programmed to time out and then revert to state A or to return to the bouncing state 38 for a programmed number of times.

In the preceding description a telephone is connected to output 1, and an automatic answering device is connected to output 2. With these devices in place, the system in HOME mode, and the system programmed as in TABLE 1, CASE 3 occurs when Groups PRIORITY (P) and ACCEPT (A) calls are received, CASE 2 occurs when Groups DEFAULT (D) AND FORWARD(F) calls are received, and CASE 1 occurs when Group REJECT(R) calls are received.

In each of the above states, shown in FIG. 3, when the system is waiting for a physical response and none occurs, a time-out is started forcing the system to returns to the idle state A.

It will now be apparent to those skilled in the art that other embodiments, improvements, details and uses can be made consistent with the letter and spirit of the foregoing disclosure and within the scope of this patent, which is limited only by the following claims, construed in accordance with the patent law, including the doctrine of equivalents.

What is claimed is:

1. Apparatus for determining the routing of externally generated incoming ring signals of an incoming telephone call, wherein a caller identification number follows the first ring signal, to a plurality of outputs comprising:
    (a) means for storing a list of caller identification numbers,
    (b) means for detecting and suppressing said first incoming ring signal such that no audible ring occurs,
    (c) means for detecting and receiving said incoming caller identification numbers,
    (d) means for comparing said incoming caller identification numbers to said stored caller identification numbers,
    (e) responsive to said comparing, means for routing said second and subsequent incoming ring signals to at least one of said outputs,
    (f) means for maintaining an on-hook condition while performing said routing,
    (g) means for programming a sequence of outputs to which incoming ring signals are to be directed,
    (h) means for programming a selected number of incoming ring signals to be directed to each output,
    (i) means for connecting said second and subsequent ring signals to each of said outputs in said sequence of outputs,
    (j) means for counting the number of ring signals occurring at each of said outputs, and
    (k) responsive to the count equaling the programmed number of ring signals at an output, means for connecting subsequent of said ring signals to the next sequential output.

2. Apparatus as defined in claim 1 further comprising:
    a telephone connected to one of said outputs, and
    an automatic answering device connected to another of said outputs.

3. Apparatus as defined in claim 1 further comprising:
    means for detecting when the output, to which the incoming ring signals are being directed, goes off-hook, and,
    responsive to said off-hook condition, means for maintaining the incoming call to said off-hook output and terminating the sequential connections to said other outputs.

4. Apparatus as defined in claim 3, further comprising:
    a device connected to an output where no audible ring occurs.

5. Apparatus as defined in claim 1 further comprising:
    means for protecting against unauthorized use of said apparatus by providing means for entering and storing a password, wherein further use of said apparatus requires said password to be entered.

6. Apparatus for determining the routing of externally generated incoming ring signals of an incoming telephone call, wherein a caller identification number follows the first ring signal, to a plurality of outputs comprising:
    means for storing a list of caller identification numbers,
    means for detecting and suppressing said first incoming ring signal such that no audible ring occurs,
    means for detecting and receiving said incoming caller identification numbers,
    means for comparing said incoming caller identification numbers to said stored caller identification numbers,
    responsive to said comparing, means for routing said second subsequent incoming ring signals to at least one of said outputs,
    means for maintaining an on-hook condition while performing said routing, and
    means for setting a plurality of priority groups, and means for identifying each of said stored caller identification numbers with a priority group,
    means for detecting the priority group of an incoming telephone call, by comparing the incoming caller identification number with the stored caller identification number,
    means for programming a sequence of outputs, responsive to said priority group of an incoming telephone call, to which each of said incoming calls are to be routed, said sequence ordered from high to low priority, and
    means for connecting said incoming call to the highest priority output.

7. Apparatus as defined in claim 6 wherein said means for routing comprises:
    means for relating the priority group of an incoming telephone call to a number of ring signals to be generated at each output of said sequence of outputs, and
    means for connecting said number of ring signals to each of said outputs in said sequence of outputs.

8. Apparatus as defined in claim 6 further comprising:
    means for setting a plurality of operating modes of said apparatus, where at least one mode is arranged and designed for when a user is at home, a second mode for when the user is not at home, and a third mode for when the user does not want to be disturbed, and
    means for assigning each of said priority groups to an operating mode, wherein the sequence of outputs, to which an incoming ring signal is to be connected, is related to the operating mode.

9. Apparatus of claim 6 further comprising means for selecting a priority group for placing incoming caller identification numbers, which do not match any stored called identification number, and
    means for placing said incoming caller identification number, which does not match any stored caller identification number into said selected priority group.

10. Apparatus as defined in claim 6 wherein means are provided for transferring caller identification numbers from a priority group to a different priority group.

11. Apparatus for determining the routing of externally generated incoming ring signals of an incoming telephone call, wherein a caller identification number follows the first ring signal, to a plurality of outputs comprising:
    means for storing a list of caller identification numbers,
    means for detecting and suppressing said first incoming ring signal such that no audible ring occurs,
    means for detecting and receiving said incoming caller identification numbers,
    means for comparing said incoming caller identification numbers to said stored caller identification numbers,
    responsive to said comparing, means for routing said second subsequent incoming ring signals to at least one of said outputs,
    means for maintaining an on-hook condition while performing said routing, and
    means, responsive to said means for comparing, for determining incoming telephone calls that are to be terminated,
    means for connecting the incoming telephone call to be terminated to an automatic answering device,
    means for detecting when said automatic answering device goes off hook, and responsive to detecting said off-hook condition, means for directly disconnecting said incoming call from said automatic answering device.

12. A method for routing of externally generated incoming ring signals of incoming telephone calls, wherein a caller identification number follows the first ring signal, to a plurality of outputs comprising the steps of:

loading and storing a list of caller identification numbers, detecting and suppressing the first ring signal of said incoming telephone calls, such that no audible ring occurs, detecting and receiving said incoming caller identification numbers, comparing said incoming caller identification numbers to said stored caller identification numbers, responsive to said comparison, routing said second and subsequent incoming ring signals to at least one of said outputs, maintaining an on-hook condition while performing said routing, programming a sequence of outputs to which said incoming ring signals are to be directed, connecting said second the subsequent incoming ring signals to each of said sequence of outputs, programming a selected number of incoming ring signals to be directed to each output, counting the number of incoming ring signals occurring at each of said outputs, responsive to the count equaling the programmed number of incoming ring signals at each output, connecting subsequent of said incoming ring signals to the next sequential output, detecting when the output, to which said incoming ring signals are being directed, goes off-hook, and responsive to said off-hook condition, maintaining the incoming call to said off-hook output and terminating the sequential connections to the other of said outputs.

13. A method as defined in claim 12 further comprises the step of:

routing the second and subsequent ring signals of the incoming call to an output connected to an automatic answering device.

14. A method as defined in claim 12 wherein said routing step comprises connecting said incoming call to an output connected to a device wherein no audible ring occurs.

15. A method as defined in claim 12 further comprising the steps of: entering and storing a passcode, wherein further operation of said method steps requires entering said passcode to protect against unauthorized operation of said method.

16. A method for routing of externally generated incoming ring signals of incoming telephone calls, wherein a caller identification number follows the first ring signal, to a plurality of outputs comprising the steps of:

loading and storing a list of caller identification numbers, detecting and suppressing the first ring signal of said incoming telephone calls, such that no audible ring occurs, detecting and receiving said incoming caller identification numbers, comparing said incoming caller identification numbers to said stored caller identification numbers, responsive to said comparison, routing said second and subsequent incoming ring signals to at least one of said outputs, maintaining an on-hook condition while performing said routing, setting a plurality of priority groups, identifying each of said stored caller identification numbers with a priority group, detecting the priority group of an incoming telephone call, by comparing the incoming caller identification number with the stored caller identification number, programming a sequence of outputs responsive to said priority group of an incoming telephone call, to which each of said incoming calls are to be routed, said sequence ordered from high to low priority, and connecting said incoming call to the highest priority output.

17. A method as defined in claim 16 further comprising the steps of:

relating the priority group of an incoming telephone call to a number of ring signals to be generated at each output of said sequence of outputs, and connecting said number of ring signals to each of said outputs in said sequence of outputs.

18. A method as defined in claim 16 further comprising the steps of:

setting a plurality of operating modes of said apparatus, where at least one mode is arranged and designed for when a user is at home, a second mode for when the user is not at home, and a third mode for when the user does not want to be disturbed, and assigning each of said priority groups to an operating mode, wherein the sequence of outputs, to which an incoming ring signal is to be connected, is related to the operating mode.

19. The method of claim 18 further comprising the steps of:

selecting a priority group for placing incoming caller identification numbers, which do not match any stored called identification number, and placing said incoming caller identification number, which does not, match any stored caller identification number into said selected priority group.

20. A method as defined in claim 19 further comprising the step of transferring caller identification numbers from an original priority group to a different priority group.

* * * * *